(12) United States Patent
Georges et al.

(10) Patent No.: US 10,423,428 B2
(45) Date of Patent: Sep. 24, 2019

(54) PROCEDURE AND CONTROL DEVICE FOR CHANGING THE OPERATING SYSTEM IN THE SERVICE NODES OF A SUPERCOMPUTER

(71) Applicant: BULL SAS, Les Clayes-sous-Bois (FR)

(72) Inventors: Julien Georges, Arpajon (FR); Thierry Iceta, Grenoble (FR); Emmanuel Flacard, Gigors et Lozeron (FR)

(73) Assignee: BULL SAS, Les Clayes-sous-Bois (FR)

( * ) Notice: Subject to any disclaimer, the term of this patent is extended or adjusted under 35 U.S.C. 154(b) by 263 days.

(21) Appl. No.: 15/129,050

(22) PCT Filed: Mar. 20, 2015

(86) PCT No.: PCT/FR2015/050691
§ 371 (c)(1),
(2) Date: Sep. 26, 2016

(87) PCT Pub. No.: WO2015/145035
PCT Pub. Date: Oct. 1, 2015

(65) Prior Publication Data
US 2017/0109180 A1    Apr. 20, 2017

(30) Foreign Application Priority Data

Mar. 25, 2014  (FR) ...................................... 14 52509

(51) Int. Cl.
*G06F 9/445* (2018.01)
*G06F 9/4401* (2018.01)
*G06F 8/61* (2018.01)

(52) U.S. Cl.
CPC ............ *G06F 9/44505* (2013.01); *G06F 8/63* (2013.01); *G06F 9/4405* (2013.01); *G06F 9/4406* (2013.01)

(58) Field of Classification Search
CPC ....... G06F 9/44505; G06F 8/63; G06F 9/4406
See application file for complete search history.

(56) References Cited

U.S. PATENT DOCUMENTS

| | | | | |
|---|---|---|---|---|
| 2003/0023839 | A1* | 1/2003 | Burkhardt | ................. G06F 8/63 713/1 |
| 2009/0083404 | A1* | 3/2009 | Lenzmeier | ................ G06F 8/60 709/221 |
| 2014/0053149 | A1* | 2/2014 | Wu | .......................... G06F 8/61 717/176 |

OTHER PUBLICATIONS

International Search Report as issued in International Patent Application No. PCT/FR2015/050691, dated Jul. 7, 2015.

(Continued)

*Primary Examiner* — Jaweed A Abbaszadeh
*Assistant Examiner* — Gayathri Sampath
(74) *Attorney, Agent, or Firm* — Pillsbury Winthrop Shaw Pittman LLP

(57) ABSTRACT

A method controls the change in operating system in selected service nodes of a high-performance computer (CHP). The method includes: a step (i) of defining, for the selected service nodes, a reduced version of a new operating system to be installed, a boot kernel, a so-called "reference" tree node software image suitable for the new operating system and including a definition of an instantiation to be established in the service nodes, and an activation module capable of locally installing the reference image in each service node; a step (ii) wherein the defined reference image, boot kernel, activation module, and reduced operating system version are transferred into the service nodes; and a step (iii) wherein the transferred activation module is used in each service node in order to locally install the transferred reference image.

8 Claims, 1 Drawing Sheet

(56) References Cited

OTHER PUBLICATIONS

Figure 1:
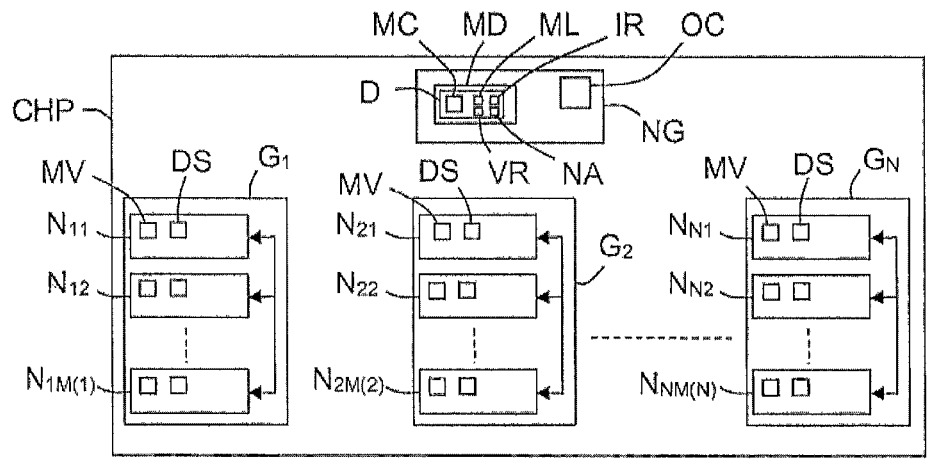

Magherusan-Stanciu, C., et al., "Grid Site Installation, Management and Monitoring Application," 2011 10$^{th}$ International Symposium on Parallel and Distributed Computing, Jul. 2011, pp. 25-32, XP032079122.

* cited by examiner

PROCEDURE AND CONTROL DEVICE FOR CHANGING THE OPERATING SYSTEM IN THE SERVICE NODES OF A SUPERCOMPUTER

CROSS REFERENCE TO RELATED APPLICATIONS

This application is the U.S. National Stage of PCT/FR2015/050691, filed Mar. 20, 2015, which in turn claims priority to French Patent Application No. 1452509 filed Mar. 25, 2014, the entire contents of all applications are incorporated herein by reference in their entireties.

The invention concerns supercomputers and more precisely the means of changing the operating system in the service nodes that supercomputers employ.

As is known in prior art, the service nodes of supercomputers are instantiated so as to operate in accordance with a tree-type software image suited to an operating system.

In the following description, by "instantiation" we mean a software arrangement allowing a service node to receive and utilise an operating system. Such an instantiation is defined by a series of instantiation commands intended to prepare a node, and in particular to generate partitioning and formatting of a service node storage drive.

Moreover, by "tree-type node software image" (or reference based tree image) we mean a snapshot of the software arrangement of a reference node in the presence of an operating system. For example, in the case of a Linux type operating system the contents of this image corresponds to a hierarchical tree of the Linux files.

Sometimes, the administrator of a supercomputer wishes to change the computational context of an ensemble of operational service nodes for an "earlier" adaptive tree-type node software image suited to an "earlier" operating system. In this case, they must put in place in these service nodes a new node tree-type software image suited to a new operating system and that corresponds to the new computational context. To do this, they may utilise a deployment tool such as Ksis® (as commercialised by the BULL SAS company).

It is hereby recalled that Ksis® is particularly configured to take a Linux software image and to deploy this snapshot over a very great number of service nodes.

There are several methods for carrying out such a deployment. One of them consists of:
  rebooting the selected service nodes (for example via PXE (or GPXE) and DHCP) requests,
  to put in place, in each of the selected service nodes, a miniature embedded operating system,
  to trigger and prepare each storage drive of each of the selected service nodes (via partitioning and formatting),
  to deploy the new tree-type node software image according to a chain process across all the selected service nodes,
  to handle the chain in case of loss of selected service nodes and/or difficulties arising in the communications network utilised,
  to put in place a basic configuration making accessible all the selected service nodes,
  to provide feedback on any detected errors, analysis carried out and deployment reporting to a management node.

Note that all the preceding operations must be carried out in a synchronous manner across all the selected service nodes and may not be uncoupled, therefore this does not facilitate their monitoring. Moreover, the step during which the service node storage drives are prepared happens very early on, and therefore if one of the following operations does not take place correctly in a selected service node (e.g. a problem arising in a memory space, on a storage drive or hardware, the earlier organisation of this service node is lost and thus rendered non-operational.

This invention, therefore, has the aim of improving the situation, notably by permitting the administrator of a supercomputer to control both in an easier and more comfortable manner the deployment operations of a new tree-type software image.

Accordingly, and for this purpose, it notably proposes a control procedure, intended to permit control over the changing of an operating system in service nodes each comprising at least one storage drive and volatile memory space, and forming part of a supercomputer, and including:
  a step (i) in which is defined for the selected service nodes a reduced version of a new operating system to be installed, a boot kernel, a so-called reference tree-type software image and comprising an instantiation definition to install in these selected service nodes and an initializing module capable of installing this reference image locally in each selected service node,
  a step (ii) in which the reference image is transferred into the selected service nodes, the boot kernel, the initializing module and the defined reduced version, and
  a step (iii) in which the boot kernel is transferred into each selected service node and launches the initial module also transferred into the latter to locally install the transferred reference image by utilising the transferred reduced version.

One may also carry out an "autonomous" deployment when desired, due to the taking into account of the fact that the service nodes of the supercomputer are accessible.

The procedure, according to this invention, may also comprise other characteristics that may be incorporated separately or in combination, and notably:
  in a first embodiment, in step (ii) the ensemble of the reference image can be transferred into the selected service nodes, the boot kernel, the initializing module and the defined reduced version, and in step (iii) the boot kernel transferred into each of the service nodes then executes the initializing module transferred along with it;
  in a second embodiment, in step (ii) the reference image is first transferred to the selected service nodes, then a triggering message is transferred to each of the selected service nodes ordering them to download a management node from the supercomputer, the reduced version and the initializing module being defined in such a manner that the latter locally automatically carries out a local installation after having been triggered by the boot kernel;
  in step (iii) each initializing module may reserve in the volatile memory of its selected service node a storage area that is specific to storing the transferred reference image, then it may load the transferred reference image into this storage area, then trigger a series of commands specific to instantiating its service node in accordance with the instantiation definition contained in the transferred reference image, and then may trigger a rebooting of its service node;
  in step (iii), before triggering the reboot, each initializing module may control the storage of the reference image on the storage drive of its service node.

The invention equally proposes a computer program product comprising an instruction set that, when executed by processing means, is able to implement a control procedure of the type presented above and to control a changing of the operating system in the service nodes each comprising at least one storage drive and volatile memory and forming part of a supercomputer.

The invention also proposes an arrangement intended to control the changing of the operating system in the service nodes each comprising at least one storage drive and volatile memory and forming part of a supercomputer, and comprising a monitoring means to control the transfer to selected service nodes of a reduced version of a new operating system to install, a boot kernel, a so-called reference tree-type node software image suited to this new operating system and comprising an instantiation definition to install in the selected service nodes, and a specific initializing module, after having been launched by the transferred boot kernel, to locally install the transferred reference image using the transferred reduced version.

The invention equally proposes a supercomputer comprising service nodes, each having at least one storage drive and volatile memory space, and a monitoring arrangement of the type presented above.

Figure 2:
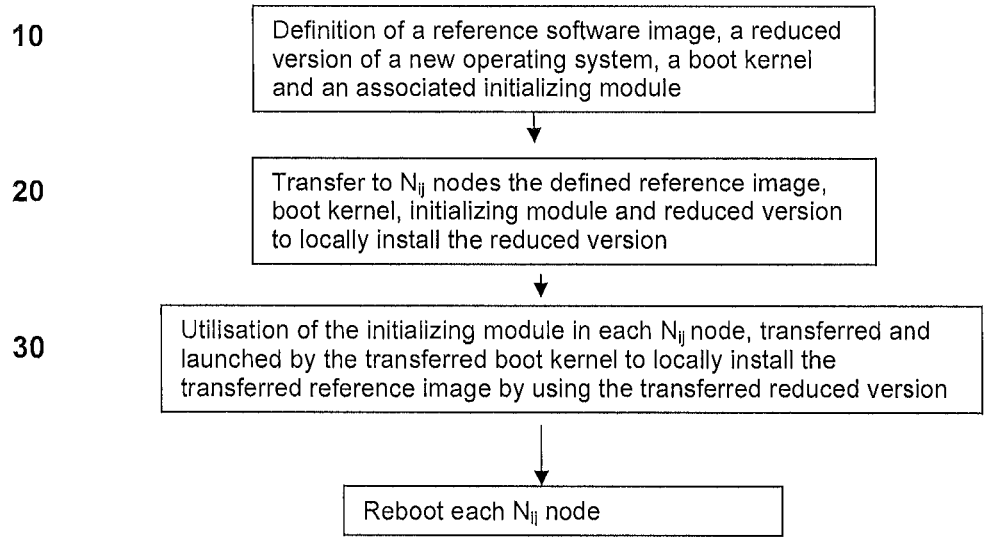

Other characteristics and advantages of the invention will appear on examination of the following detailed description, and drawing figures, and in which:

FIG. 1 provides a schematic and functional illustration of a supercomputer equipped with an example of an embodiment of the control arrangements according to the invention, and FIG. 2 illustrates an example of an algorithm implementing a control procedure according to the invention.

The invention notably aims at offering a control procedure, and an associated monitoring arrangement $D_i$ intended to permit the control of the operating system changeover in the $N_{ij}$ service nodes of a supercomputer CHP equally comprising a management node NG.

In FIG. 1 is schematically shown a non-limitative example of a supercomputer CHP. In this example, the 5 service nodes $N_{ij}$ of supercomputer CHP are grouped in N high availability (HA) groups $G_i$ (where i=1 to N). Each (high availability) group $G_i$ comprises M(i) service nodes $N_{ij}$ (where j=1 to M(i)). For example, N equals 10 and M(i) equals 500 whatever the $G_i$ group considered (and thus whatever the value of the index i). But the number of nodes $N_{ij}$ may vary from one group $G_i$ to another $G_i$. Moreover, the number N of groups $G_i$ may take whatever value superior or equal to one (1). In the same way, the number M(i) of nodes $N_{ij}$ of a group $G_i$ may take any value higher than or equal to three (3).

The (service) nodes $N_{ij}$ or groups $G_i$ may, for example, be coupled with each other and the management node NG via at least one communication network (for example the Internet).

Each node $N_{ij}$ has available resources that are generally shared with other nodes Nij (j'≠j) of its group $G_i$, under the control of High Availability (HA) software. These resources may be of any type when it concerns the configurable services useful to the CHP computer, or an application running on this CHP computer. Furthermore, each node $N_{ij}$ comprises at least one storage drive DS and volatile memory MV, for example Random Access Memory type (RAM). In addition, each node $N_{ij}$ is instantiated in such a way as to function in accordance with a tree-type node software image suited to an operating system. Consequently, each node $N_{ij}$ is considered operational. It will be noted that the software image (tree-type node), that once instantiated then constitutes an operating system, and is stored (loaded) into the volatile memory MV of each node $N_{ij}$.

It should be recalled that the operating system is loaded to ensure the interface between the application software and the hardware.

The management node NG preferentially comprises a configuration tool OC intended to configure the resources of the nodes $N_{ij}$. It is considered in the following non-limitative example, that the configuration tool OC is Kconf® (as commercialised by BULL SAS).

As indicated earlier, the invention proposes a procedure intended to provide control over the changing of the operating system in the nodes $N_{ij}$ selected by the computer CHP. For example, all the nodes $N_{ij}$ of the computer CHP may be concerned by this changeover. In a first variant, it is all the nodes $N_{ij}$ of at least one of the groups $G_i$ that may be concerned by this changeover. In a second variant, only certain nodes $N_{ij}$ of at least one of the groups G, may be concerned by this changeover.

This procedure comprises a first (i), second (ii) and third (iii) steps. According to the invention, at least the second step (ii) may be concerned by a monitoring arrangement D.

In the non-limitative example illustrated in FIG. 1, the monitoring arrangement D forms part of the management node NG, and more precisely the deployment module MD (in this case Ksis®) of the latter (OC). But this is not mandatory. It may in fact be equipment which is external to the management node NG but which is accessible by the latter (CHP), for example via a computer connection. Consequently, the monitoring arrangement D may be realized, either in the form of software modules; we are therefore in the presence of a computer program product including an instruction set that, when executed by electronic circuit processing means (hardware), is able to implement at least one part of the control procedure, either in the form of a combination of software modules or electronic circuits.

During the first step (i) of the procedure according to the invention, a person authorized by the administrator of the computer CHP, defines for the selected service nodes $N_{ij}$ a reduced version VR of a new operating system to install, a boot kernel NA, a reference tree-type node software image IR, suited to this new operating system and comprising a definition of an instantiation to install in these selected nodes $N_{ij}$, and an initializing module ML specific to installing this reference image IR locally in each selected $N_{ij}$ node.

It is important to note that that which differentiates a reference image IR (according to the invention) from a (classical) tree-type node software image, is the fact that it comprises in addition to the latter the instantiation definition that must be installed in the selected $N_{ij}$ nodes.

It is therefore a snapshot of a new selected $N_{ij}$ node arrangement in the presence of a new operating system to which is added a series of instantiation commands intended to prepare the selected $N_{ij}$ node, and notably to provoke a selected partitioning of a storage drive DS of this selected $N_{ij}$ node.

For example, the new operating system may be Linux or a particular version of Linux.

The boot kernel NA is a program that loads (or executes) the associated ML initializing module.

The reduced version VR of the new operating system is an ensemble of commands intended to permit the initializing module ML to load the associated reference image IR and to instantiate a selected $N_{ij}$ node into which it is transferred. This ensemble may, for example, comprise around a hundred commands.

The initializing module ML is a computer program that is loaded, and when executed by the associated boot kernel NA, installs a reference image IR in the selected $N_{ij}$ node into which it is transferred by using the associated reduced version VR.

For example, and as non-limitatively illustrated in FIG. 1, the reduced version VR, the boot kernel NA, the reference image IR and the initializing module ML may be stored in a memory space of the configuration tool OC, which eventually forms part of the deployment module MD (or control device D). It should be noted that the management node NG comprises a man/machine interface (MMI) (not shown here) that may permit a person (authorised by the administrator of the supercomputer CHP) to design and optimise the definitions of the reduced version VR, the boot kernel NA, the reference image IR and the initializing module ML. It should equally be noted that the control device D may also be arranged so as to supervise this designing and optimisation of the definitions via the man/machine interface.

During the second step (ii) of the procedure according to the invention, are transferred into the selected (service) nodes $N_{ij}$, reference image IR, boot kernel NA, initializing module ML and the reduced version VR that were defined in step (i).

This transfer may be carried out in at least two different ways.

One first way consists of transferring the ensemble into each of the selected $N_{ij}$ nodes the reference image IR, the boot kernel NA, the initial module ML and the reduced version VR that were defined in step (i). This transfer is triggered by the management node NG and controlled by the control means MC of the control device D at the request of the supercomputer CHP administrator.

A second means consists of starting by transferring into each of the $N_{ij}$ selected nodes only the reference image IR, then transmitting to each of the selected $N_{ij}$ nodes a triggering message ordering the download of the management node NG, the boot kernel NA, the reduced version VR and the initializing module ML that have been defined and that are associated with the reference image IR transferred. These two transfers may be deferred over time, and triggered by the management node NG and controlled by the control means MC of the control device D at the request of the supercomputer CHP administrator.

For example, the triggering message triggers automatically in the $N_{ij}$ node that receives it a network type PXE (or GPXE) boot program that then in turn organises the download with the management node NG.

Each transfer may, for example, be carried out via the «ksis copy» command that is provided in the Ksis® deployment module. But any other Linux copy type command across a communication network may be used.

Once the reference image IR has been transferred to a selected $N_{ij}$ node, it is stored on the hard drive DS of the latter ($N_{ij}$). Moreover, once the boot kernel NA, reduced version VR and initializing module ML have been transferred to the selected $N_{ij}$ node, they are stored in the volatile memory MV of the latter ($N_{ij}$).

During step (iii) of the procedure according to the invention, the boot kernel NA is transferred into each selected service node $N_{ij}$ and launches the initializing module ML transferred into the latter ($N_{ij}$) to locally install the transferred reference image IR by utilising the transferred reduced version VR.

The triggering of this local utilisation of the initializing module ML may be carried out automatically as soon as this initializing module ML is stored in the volatile memory MV of a selected $N_{ij}$ node and at the same time as the associated boot kernel NA.

For example, in step (iii) each initializing module ML may begin by analysing the reference image IR transferred and the storage capacity still available in the volatile memory MV of its selected $N_{ij}$ node in order to reserve in this volatile memory a storage area in which to store the reference image IR. Then, this initializing module ML may load the reference image IR into this storage area. Then this initializing module ML may trigger a series of specific commands to instantiate its $N_{ij}$ node in accordance with the instantiation definition contained in this reference image IR. To do this, it utilises the commands contained in the reduced version VR loaded with it into the volatile memory MV. This notably provokes a partitioning of the storage drive DS, and then a formatting of the latter.

The instantiation operations being almost the last to be carried out, if a problem arises beforehand, the $N_{ij}$ node does not become non-operational since it continues to function with the old reference image that has not yet been uninstalled.

If the instantiation has been correctly carried out, the initializing module ML triggers a reboot of its $N_{ij}$ node so that it now operates in accordance with the newly installed reference image IR that is suited to the new operating system.

Preferably, in step (iii), before triggering the reboot each initializing module ML checks for the complete storage of the reference image IR, possibly a compressed version, on the storage drive DS of its $N_{ij}$ node, so that in case of an error in the installation of this new reference image IR it is not obliged to restart its transfer (in this case it is sufficient to restart the transfer of the boot kernel NA of the reduced version VR and the associated initializing module ML, or to reinstall the old reference image stored on storage drive DS and which permits a correct functioning). Note also that each initializing module ML may also possibly check the storage of the old reference image, possibly in a compressed version, on the storage drive of its $N_{ij}$ node.

In FIG. 2 is schematically shown an example of an algorithm implementing an example of a control procedure according to the invention.

This algorithm comprises a sub-step 10 in which an individual defines for the selected service nodes $N_{ij}$ a reduced version VR of a new operating system to install, a boot kernel NA, a reference image IR, suited to this new operating system and comprising a definition of an instantiation to install in these nodes $N_{ij}$, and an initializing module ML specific to installing this reference image IR locally in each selected node $N_{ij}$. This reduced version, boot kernel NA, reference image IR and this initializing module is then stored, for example in the management node NG of the computer CHP.

This sub-step 10 here constitutes step (i) of the control procedure according to the invention.

The algorithm continues and in a sub-step 20 in which (the management node NG under the control of control device D) transfers into the selected $N_{ij}$ nodes (in one or two phases) the reference image IR, the boot kernel NA, initializing module ML and the reduced version VR defined in sub-step 10.

This sub-step 20 constitutes here step (ii) of the control procedure according to the invention.

Then, in sub-step 30 the boot kernel is transferred into each selected $N_{ij}$ node and launches the initializing module ML transferred into the latter to locally install the transferred reference image IR by utilising the reduced version VR.

Lastly, in sub-step 40, each initializing module ML triggers a reboot of its Nij service node.

The sub-steps 30 and 40 here constitute step (iii) of the control procedure of the invention.

Note that the invention permits the transfer into service nodes of several reference images, in order to permit the administrator to choose among the various reference images transferred the one that they actually wish to put in place at any given moment. Moreover, the moment the administrator decides to carry out a transfer may be the one where the communication network coupling the nodes is at its peak performance in relation to a desired security context. Furthermore, the putting in place of one of the transferred reference images can be effected at the same time that the computer CHP executes a task. In addition, the autonomous deployment that the invention offers permits an easy reinstalling, at whatever time chosen by the administrator, of an earlier reference image.

The invention does not limit itself to the control procedures, control device and supercomputer described in the foregoing, and given only by way of example, but in fact covers all the variants that those skilled in the art may envisage within the framework of the following claims.

The invention claimed is:

1. A control method for controlling a change of an operating system in service nodes each comprising at least one storage drive and a volatile memory and forming part of a supercomputer, the method comprising a step (i) of defining for selected service nodes a reduced version of a new operating system to install, a boot kernel, a tree-type node software reference image, configured to the new operating system and comprising a definition of an instantiation to install in the selected service nodes, and an initializing module comprising machine executable instructions, which when executed by the boot kernel, are configured to install the tree-type node software reference image locally in each selected service node, the reduced version of the new operating system including a plurality of commands intended to permit the initializing module to load the tree-type node software reference image and to instantiate the selected service nodes, a step (ii) of transferring into the selected service nodes the tree-type node software reference image, the boot kernel, the initializing module and the reduced version of the new operating system to install, and a step (iii) of executing by the boot kernel transferred to each selected service node the initializing module transferred into the selected service node to locally install the tree-type node software reference image transferred by using the reduced version of the new operating system.

2. The method according to claim 1, wherein step (ii) includes transferring into the selected service nodes, an ensemble that includes the tree-type node software reference image, the boot kernel, the initializing module and the reduced version of the new operating system, and wherein step (iii) includes executing by the boot kernel transferred into each of the selected service nodes the initializing module transferred along with it in the ensemble.

3. The method according to claim 1, wherein step (ii) includes first transferring the tree-type node software reference image into the selected service nodes, then transferring to each of the selected service nodes a triggering message commanding the download from a management node of the supercomputer the boot kernel, the reduced version of the new operating system and the initializing module in such a manner that the initializing module automatically and locally carries out the local installation after having been executed by the boot kernel.

4. The method according to claim 2, wherein step (iii) includes reserving, by each initializing module in the volatile memory of its selected service node, a storage area configured to store the tree-type node software reference image, and loading the tree-type node software reference image that has been transferred into the storage area, then triggering the plurality of commands configured to instantiate its service node in accordance with the instantiation definition contained in the tree-type node software reference image that has been transferred, and then triggering a reboot of its service node.

5. The method according to claim 4, wherein step (iii) includes before triggering the reboot, checking by each initializing module the storage of the tree-type node software reference image on the storage drive of its service node.

6. A non-transitory computer program product comprising a plurality of instructions that, when executed by processing means, implement the method according to claim 1 to control a changeover of the operating system in the service nodes each comprising at least one storage drive and a volatile memory space and forming part of a supercomputer.

7. A control device for controlling a change of an operating system in service nodes and comprising each at least one storage drive and a volatile memory and forming part of a supercomputer, the control device comprising a control system arranged to check and control a transfer into selected service nodes of a reduced version of a new operating system to install, a boot kernel, a tree-type node software reference image, configured to the new operating system and comprising an instantiation definition to install in the selected service nodes, and an initializing module configured, after having been executed by the boot kernel, to locally install the tree-type node software reference image by using the reduced version of the new operating system, wherein the reduced version of the new operating system includes a plurality of commands intended to permit the initializing module to load the tree-type node software reference image and to instantiate the selected service nodes.

8. A supercomputer comprising service nodes each comprising the at least one storage drive and the volatile memory, and the control device according to claim 7.

* * * * *